(12) United States Patent
Muldoon et al.

(10) Patent No.: US 12,152,535 B2
(45) Date of Patent: Nov. 26, 2024

(54) ELECTRIC MACHINE WITHIN A TURBINE ENGINE

(71) Applicant: Raytheon Technologies Corporation, Farmington, CT (US)

(72) Inventors: Marc J. Muldoon, Marlborough, CT (US); Russell B. Witlicki, Wethersfield, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/967,345

(22) Filed: Oct. 17, 2022

(65) Prior Publication Data

US 2023/0117331 A1 Apr. 20, 2023

Related U.S. Application Data

(60) Provisional application No. 63/256,334, filed on Oct. 15, 2021.

(51) Int. Cl.
*F02C 7/32* (2006.01)
*F02C 6/00* (2006.01)
*F02C 7/36* (2006.01)

(52) U.S. Cl.
CPC ............... *F02C 7/32* (2013.01); *F02C 6/00* (2013.01); *F02C 7/36* (2013.01); *F05D 2220/32* (2013.01); *F05D 2220/76* (2013.01); *F05D 2260/40* (2013.01)

(58) Field of Classification Search
None
See application file for complete search history.

(56) References Cited

U.S. PATENT DOCUMENTS

| | | |
|---|---|---|
| 7,874,163 B2 | 1/2011 | Merry |
| 9,018,821 B2 | 4/2015 | Stiesdal |
| 9,917,490 B2 | 3/2018 | Lemmers |
| 10,071,811 B2 | 9/2018 | Kupiszewski |
| 10,308,366 B2 | 6/2019 | Kupiszewski |
| 10,487,839 B2 | 11/2019 | Kupiszewski |
| 10,801,410 B2 | 10/2020 | Roberge |
| 11,085,515 B2 | 8/2021 | Moniz |

(Continued)

FOREIGN PATENT DOCUMENTS

| | | |
|---|---|---|
| EP | 3159515 A1 | 4/2017 |
| EP | 3544152 B1 | 10/2020 |
| WO | 2020084241 A1 | 4/2020 |

OTHER PUBLICATIONS

"American National Standard Design Manual for Enclosed Epicyclic Gear Drives", ANSI/AGMA 6023-A88, Nov. 1988.
GB search report for GB2215244.1 dated Mar. 24, 2023.

*Primary Examiner* — Ehud Gartenberg
*Assistant Examiner* — Jacek Lisowski
(74) *Attorney, Agent, or Firm* — Getz Balich LLC

(57) ABSTRACT

An assembly is provided for a turbine engine. This turbine engine assembly includes a rotating structure, a stationary structure and an electric machine. The rotating structure is configured to rotate about a rotational axis. The stationary structure circumscribes the rotating structure. The electric machine includes a rotor and a stator. The rotor circumscribes the rotating structure and is coupled to the rotating structure through a spline connection. The stator is connected to the stationary structure.

19 Claims, 6 Drawing Sheets

(56) References Cited

U.S. PATENT DOCUMENTS

| | | | |
|---|---|---|---|
| 2014/0378260 A1* | 12/2014 | Dewar | F16H 57/021 |
| | | | 475/149 |
| 2017/0335710 A1 | 11/2017 | Klemen | |
| 2018/0051701 A1 | 2/2018 | Kupiszewski | |
| 2019/0081524 A1* | 3/2019 | Takano | H02K 5/203 |
| 2019/0085715 A1 | 3/2019 | Van Der Merwe | |
| 2019/0293117 A1* | 9/2019 | Ertas | F01D 25/16 |
| 2020/0044518 A1* | 2/2020 | Miller | F02C 7/32 |
| 2020/0063606 A1 | 2/2020 | Miller | |
| 2020/0204021 A1* | 6/2020 | Kim | H02K 9/19 |
| 2021/0010382 A1 | 1/2021 | Davies | |
| 2021/0010383 A1 | 1/2021 | Bradley | |
| 2021/0010384 A1 | 1/2021 | Bradley | |
| 2021/0079850 A1 | 3/2021 | Davies | |
| 2021/0234422 A1* | 7/2021 | Takeno | B60K 11/02 |
| 2021/0396141 A1 | 12/2021 | Charier | |
| 2021/0396193 A1 | 12/2021 | Guillotel | |
| 2022/0340292 A1* | 10/2022 | Churchill | B64C 29/0008 |

\* cited by examiner

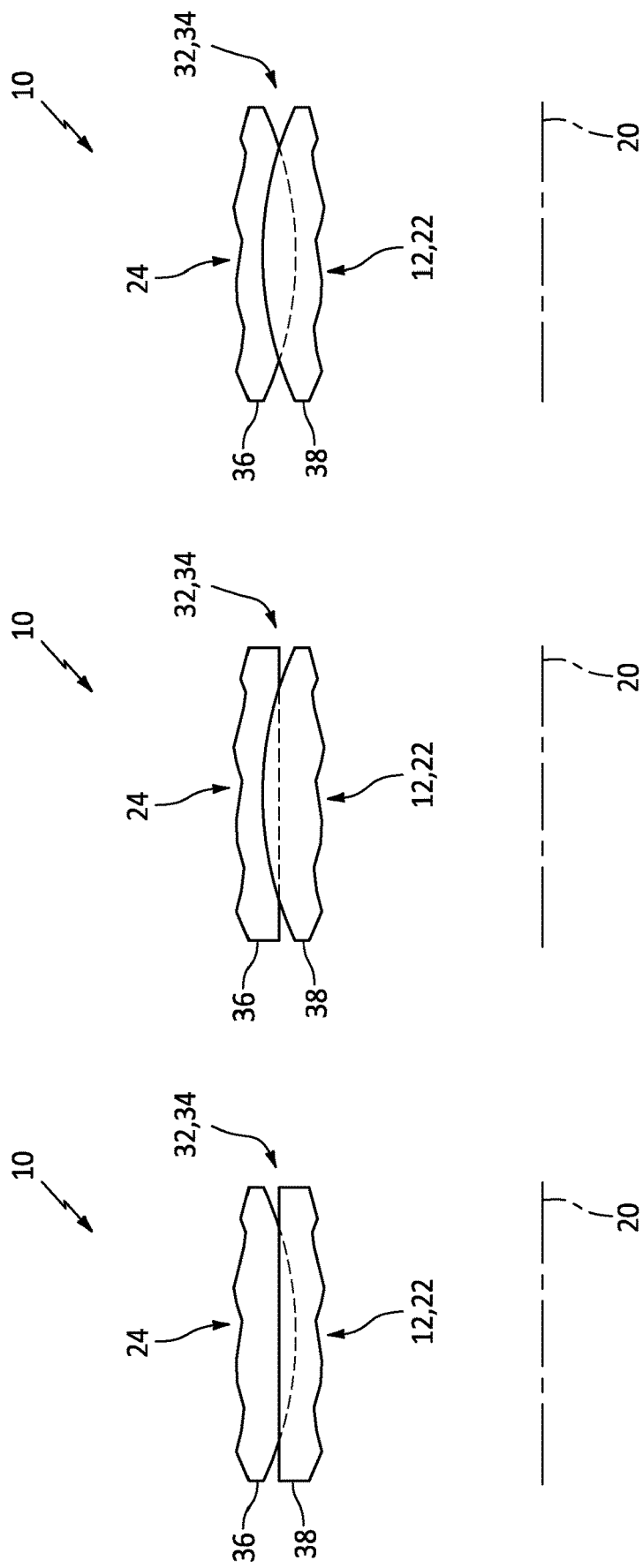

ELECTRIC MACHINE WITHIN A TURBINE ENGINE

This application claims priority to U.S. Patent Appln. No. 63/256,334 filed Oct. 15, 2021, which is hereby incorporated herein by reference in its entirety.

BACKGROUND OF THE DISCLOSURE

1. Technical Field

This disclosure relates generally to a turbine engine and, more particularly, to an electric machine for the turbine engine.

2. Background Information

A gas turbine engine may include an electric machine for providing mechanical power and/or electricity. The electric machine is typically connected to a gearbox outside of a core of the engine, where the gearbox is coupled with a rotor within the engine core via a tower shaft. Some efforts have been made to arrange the electric machine within the engine core to reduce overall size of the gas turbine engine. There is a need in the art, however, for structures and architectures which facilitate arrangement of the electric machine within the engine core.

SUMMARY OF THE DISCLOSURE

According to an aspect of the present disclosure, an assembly is provided for a turbine engine. This turbine engine assembly includes a rotating structure, a stationary structure and an electric machine. The rotating structure is configured to rotate about a rotational axis. The stationary structure circumscribes the rotating structure. The electric machine includes a rotor and a stator. The rotor circumscribes the rotating structure and is coupled to the rotating structure through a spline connection. The stator is connected to the stationary structure.

According to another aspect of the present disclosure, another assembly is provided for a turbine engine. This turbine engine assembly includes a rotating structure, a stationary structure and an electric machine. The rotating structure is configured to rotate about a rotational axis. The stationary structure circumscribes the rotating structure. The stationary structure includes a base support and a flexible coupling. The electric machine includes a rotor and a stator. The rotor is coupled to the rotating structure through a compliant connection. The stator is connected to the base support through the flexible coupling.

According to still another aspect of the present disclosure, another assembly is provided for a turbine engine. This turbine engine assembly includes a rotating structure, a stationary structure and an electric machine. The rotating structure is configured to rotate about a rotational axis. The rotating structure includes a first shaft segment, a second shaft segment and a flexible coupling connecting the first shaft segment to the second shaft segment. The stationary structure circumscribes the rotating structure. The electric machine includes a rotor and a stator. The rotor is coupled to the first shaft segment through a compliant connection. The stator is connected to the stationary structure.

The rotating structure may include a first shaft segment, a second shaft segment and a second flexible coupling connecting the first shaft segment to the second shaft segment. The compliant connection may couple the rotor to the first shaft segment.

The compliant connection may be configured as or otherwise include a spline connection between the rotor and the rotating structure.

The electric machine may also include a first bearing and a second bearing. The rotor may be rotatably supported by the first bearing and the second bearing. The compliant connection may be arranged axially between the first bearing and the second bearing along the rotational axis.

The spline connection may be configured as or otherwise include a crowned spline connection.

The spline connection may be axially aligned with the rotor along the rotational axis.

The electric machine may also include a first bearing and a second bearing. The rotor may be rotatably supported by the first bearing and the second bearing. The spline connection may be disposed axially between the first bearing and the second bearing along the rotational axis.

The electric machine may also include a case housing the rotor and the stator. The rotor may be rotatably mounted to the case by the first bearing and the second bearing. The stator may be mounted to the case adjacent the rotor.

A first portion of the rotor may circumscribe the first bearing, and the first bearing may circumscribe a first portion of the case. In addition or alternatively, a second portion of the rotor may circumscribe the second bearing, and the second bearing may circumscribe a second portion of the case.

The rotor may be arranged radially between the stator and the first bearing. In addition or alternatively, the rotor may be arranged radially between the stator and the second bearing.

The stationary structure may include a base support and a flexible coupling. The stator may be connected to the base support through the flexible coupling.

The rotating structure may include a first shaft segment, a second shaft segment and a flexible coupling connecting the first shaft segment to the second shaft segment. The spline connection may couple the rotor to the first shaft segment.

The electric machine may be configured as a motor during at least one mode of operation.

The electric machine may be configured as a generator during at least one mode of operation.

The turbine engine assembly may also include a compressor section, a combustor section and a turbine section arranged along the rotational axis. A case may house the compressor section, the combustor section, the turbine section and the electric machine.

The turbine engine assembly may also include a compressor section, a combustor section, a turbine section and a flowpath extending sequentially through the compressor section, the combustor section and the turbine section. The electric machine may be radially inboard of the flowpath.

The rotating structure may include a compressor rotor, a turbine rotor and a shaft coupling the turbine rotor to the compressor rotor.

The compressor rotor and the turbine rotor may be axially disposed to a common side of the electric machine.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIGS. 3A-E are partial illustrations of various arrangements for the spline connection between the electric machine rotor and the rotating structure.

DETAILED DESCRIPTION

Figure 1:
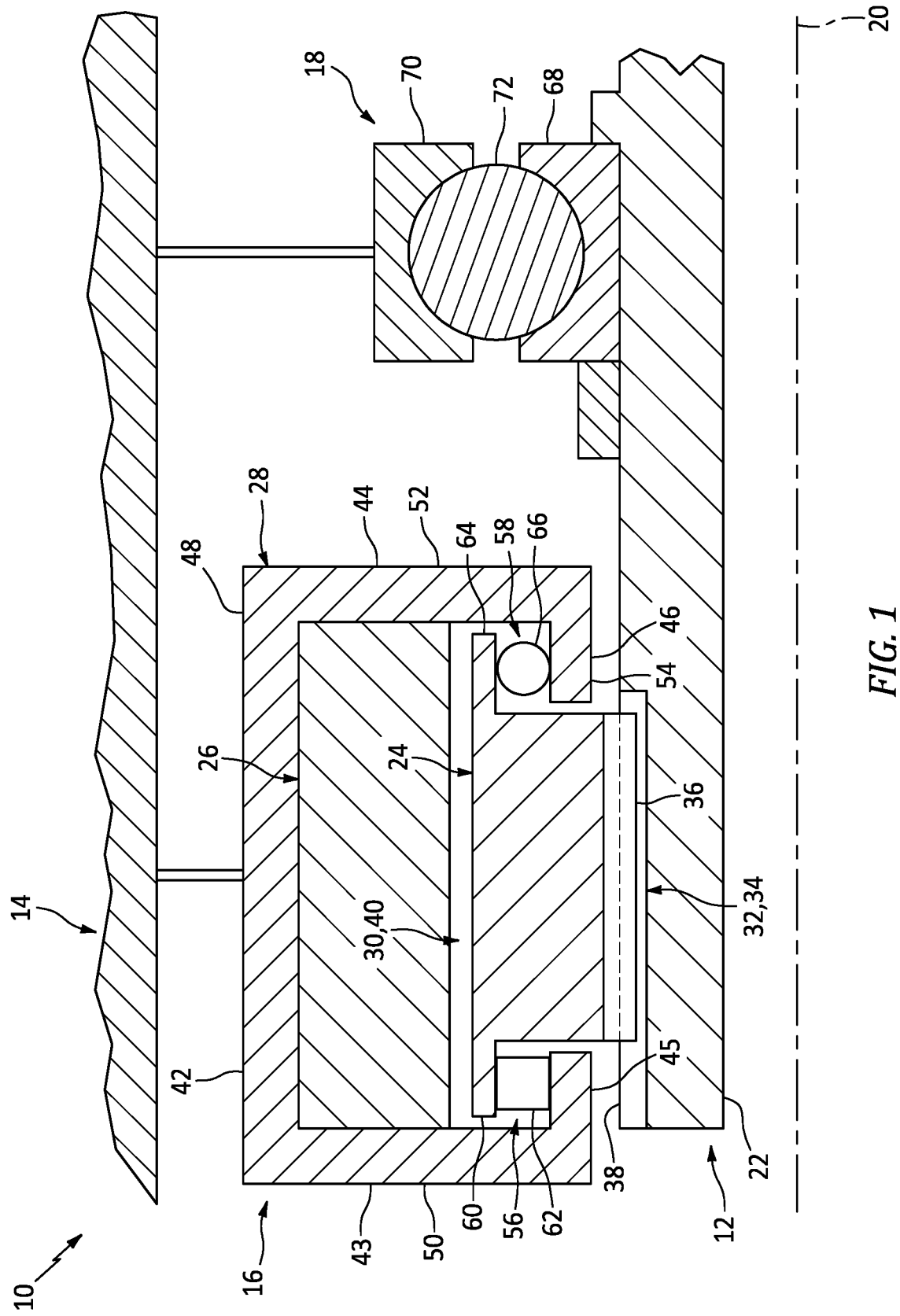
FIG. 1 is a partial side sectional illustration of an assembly for a turbine engine.

FIG. 1 illustrates an assembly 10 for a turbine engine. This turbine engine assembly 10 includes a rotating structure 12, a stationary structure 14 and an electric machine 16. The turbine engine assembly 10 also includes a rotating structure bearing 18 that rotatably mounts the rotating structure 12 to the stationary structure 14.

The rotating structure 12 extends axially along and circumferentially around a rotational axis 20, which rotational axis 20 may be an axial centerline of the turbine engine assembly 10. The rotating structure 12 is rotatable about the rotational axis 20. The rotating structure 12 may be configured as or otherwise include any rotatable component or assembly of rotatable components within the turbine engine. The rotating structure 12 of FIG. 1, for example, is configured as or otherwise include a turbine engine shaft 22. In some embodiments, the rotating structure 12 may also include one or more additional elements such as, but not limited to, sleeves, spacers, rotors, etc. Furthermore, while the turbine engine shaft 22 is generally depicted as a single monolithic body, the turbine engine shaft 22 may alternatively include a plurality of interconnected shafts/shaft sections.

The stationary structure 14 may be configured as or otherwise include any stationary (e.g., static, non-rotating) component or assembly of stationary components within the turbine engine. The stationary structure 14, for example, may include a turbine engine case and one or more internal support structures within and connected to the turbine engine case.

The electric machine 16 is configurable as an electric motor and/or an electric generator. For example, during a motor mode of operation, the electric machine 16 may operate as the electric motor to convert electricity (e.g., received from a battery and/or another electricity source) into mechanical power; e.g., torque. This mechanical power may be utilized for various purposes within the turbine engine such as, for example, rotating the rotating structure 12 during turbine engine startup. During a generator mode of operation, the electric machine 16 may operate as the electric generator to convert mechanical power (e.g., received through the rotating structure 12) into electricity. This electricity may be utilized for various purposes within the turbine engine such as, for example, electrically powering one or more electric components of the turbine engine and/or charging the battery. The electricity may also or alternatively be utilized for various purposes outside of the turbine engine such as, for example, electrically powering one or more electrical components in an aircraft.

The electric machine 16 includes an (e.g., annular) electric machine rotor 24 and an (e.g., annular) electric machine stator 26. The electric machine 16 also includes an (e.g., annular) electric machine case 28 that at least partially or completely houses the machine rotor 24 and/or the machine stator 26.

The machine rotor 24 is at least partially disposed within an internal cavity 30 of the machine case 28. The machine rotor 24 is connected (e.g., rotationally fixed) to the rotating structure 12 and its turbine engine shaft 22. The machine rotor 24 of FIG. 1, for example, is coupled to the rotating structure 12 and its turbine engine shaft 22 by a compliant connection 32. The machine rotor 24 is thereby configured to rotate with the rotating structure 12 and its turbine engine shaft 22 about the rotational axis 20.

Figure 2:
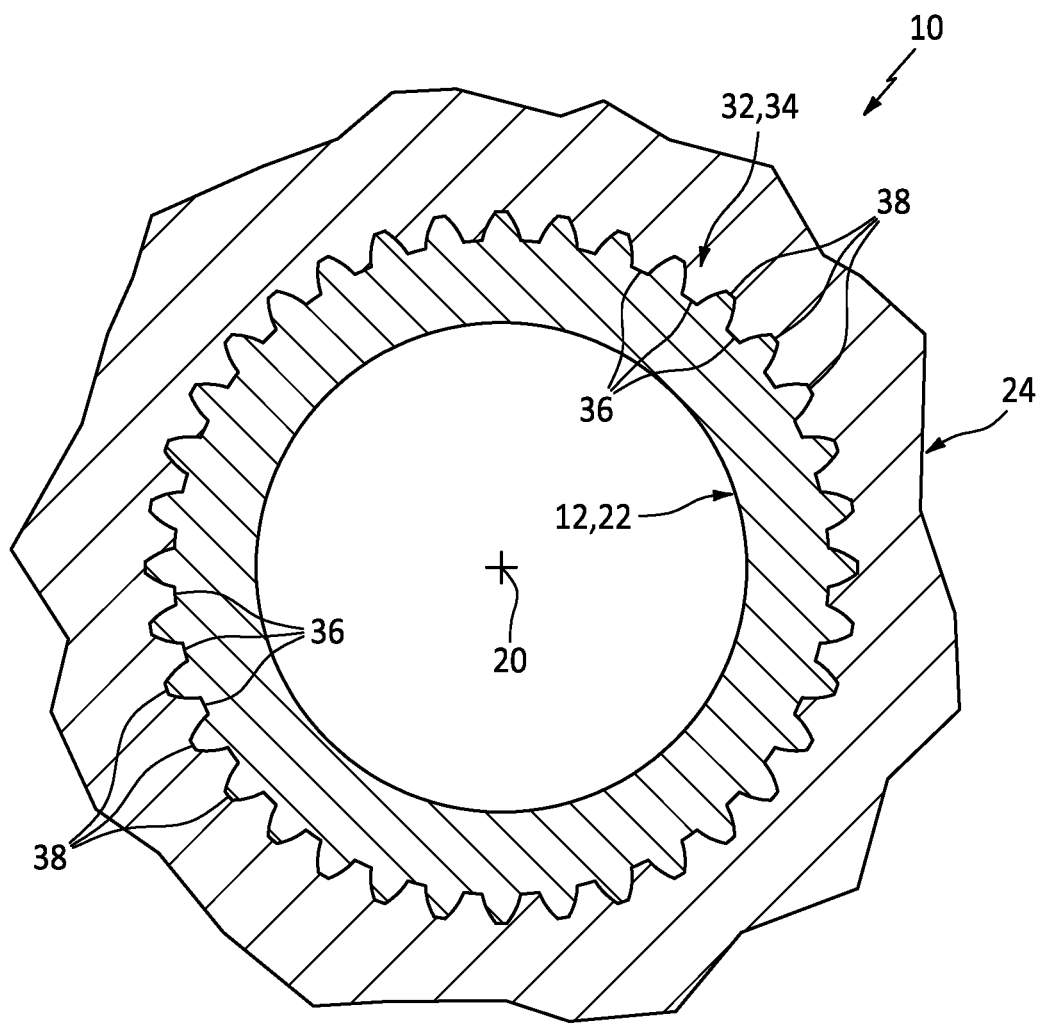
FIG. 2 is a partial cross-sectional illustration of at a spline connection between an electric machine rotor and a rotating structure.

The compliant connection 32 may be configured as a spline connection 34. The machine rotor 24 of FIG. 2, for example, includes a plurality of (e.g., internal) machine rotor splines 36 (e.g., ribs, teeth, etc.), and the rotating structure 12 and its turbine engine shaft 22 include a plurality of (e.g., external) rotating structure splines 38 (e.g., ribs, teeth, etc.). The rotor splines 36 are arranged circumferentially about the rotational axis 20 in an annular array, and the structure splines 38 are arranged circumferentially about the rotational axis 20 in an annular array. The rotor splines 36 are meshed with the structure splines 38. The rotor splines 36 of FIG. 2, for example, are interspersed with the structure splines 38, and the structure splines 38 are interspersed with the rotor splines 36. More particularly, each rotor spline 36 projects radially (e.g., inward) into a respective rotating structure groove in the rotating structure 12 and its turbine engine shaft 22, where the structure groove is formed by and circumferentially between a circumferentially adjacent pair of structure splines 38. Similarly, each structure spline 38 projects radially (e.g., outward) into a respective machine rotor groove in the machine rotor 24, where the rotor groove is formed by and circumferentially between a circumferentially adjacent pair of rotor splines 36. With this arrangement, the machine rotor 24 and the rotating structure 12 and its turbine engine shaft 22 may slightly move (e.g., axially translate) relative to one another during turbine engine operation.

Figure 3E:
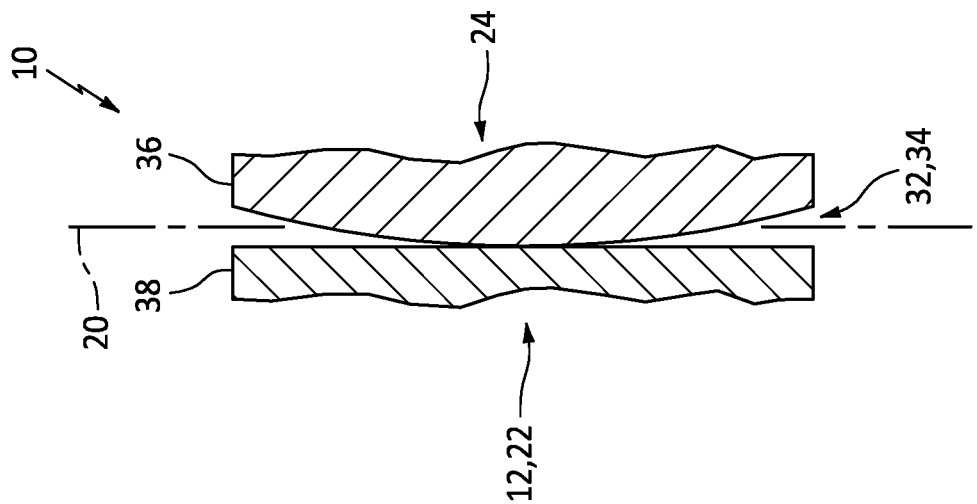
Figure 3D:
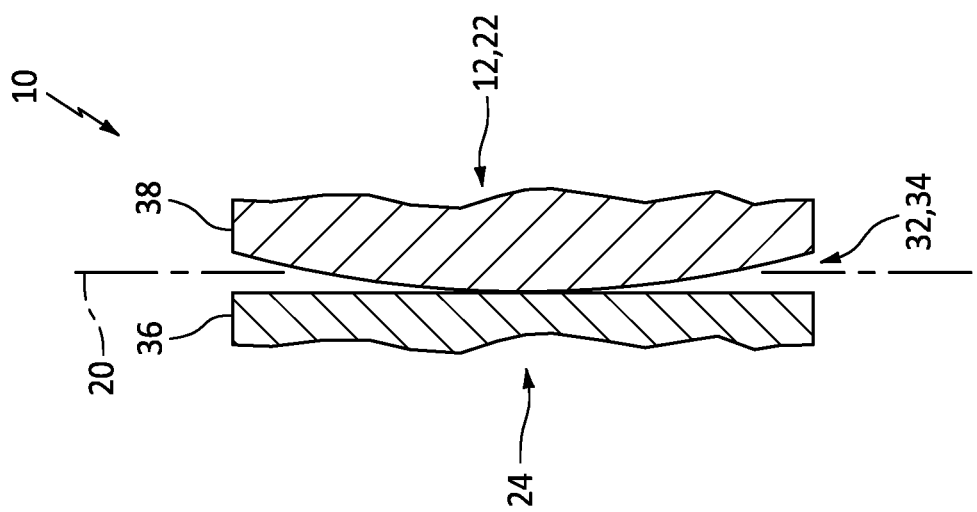

In some embodiments, referring to FIGS. 3A-E, the spline connection 34 may be configured as a crowned spline connection with, for example, a major diameter coupling or a side-fit coupling. For example, the spline connection 34 of FIG. 3A is configured as a single crowned spline connection where the rotor splines 36 are crowned splines and the structure splines 38 are non-crowned (e.g., rectangular, straight) splines. Each rotor spline 36 of FIG. 3A, for example, has a convex (e.g., curved, arcuate, etc.) tip profile when viewed, for example, in a reference plane parallel with and/or coincident with the rotational axis 20. Each structure spline 38 of FIG. 3A, by contrast, has a straight tip profile when viewed, for example, in the reference plane. In another example, the spline connection 34 of FIG. 3B is configured as a single crowned spline connection where the structure splines 38 are crowned splines and the rotor splines 36 are non-crowned (e.g., rectangular, straight) splines. Each structure spline 38 of FIG. 3B, for example, has a convex (e.g., curved, arcuate, etc.) tip profile when viewed, for example, in the reference plane. Each rotor spline 36 of FIG. 3B, by contrast, has a straight tip profile when viewed, for example, in the reference plane. In still another example, the spline connection 34 of FIG. 3C is configured as a double crowned spline connection where the rotor splines 36 and the structure splines 38 are crowned splines. Each rotor spline 36 of FIG. 3C, for example, has a convex (e.g., curved, arcuate, etc.) tip profile when viewed, for example, in the reference plane. Similarly, each structure spline 38 of FIG. 3C has a convex (e.g., curved, arcuate, etc.) tip profile when viewed, for example, in the reference plane. In addition to or as an alternative to the profiles of FIGS. 3A-C, each of the splines 38 of FIG. 3D has a convex (e.g., curved, arcuate, etc.) flank side profile when viewed, for example, in a second reference plane parallel with and radially spaced from the rotational axis 20. Each of the splines 36 of FIG. 3D, by contrast, may be configured with a straight flank side profile when viewed, for example, in the second reference plane. In another example, each of the splines 36 of FIG. 3E has a convex (e.g., curved, arcuate, etc.) flank side profile when viewed, for example, in the second reference plane. Each of the splines 38 of FIG. 3E, by contrast, may be configured with a straight flank side profile when viewed, for example, in the second reference plane.

The spline connections 34 of FIGS. 3A-E may accommodate additional (e.g., more than just axial) movement between the machine rotor 24 and the rotating structure 12 and its turbine engine shaft 22. The spline connections 34 of FIGS. 3A-E, for example, may accommodate slight axial mis-alignment (e.g., pivoting) between the machine rotor 24 and the rotating structure 12. The compliant connection 32 may thereby accommodate various operational shifts between the rotating structure 12 and the electric machine 16 and/or the stationary structure 14 during turbine engine operation where, for example, an axial centerline of the rotating structure 12 and its turbine engine shaft 22 may become momentarily angularly offset from an axial centerline of the machine rotor 24.

Referring to FIG. 1, the machine stator 26 is (e.g., completely) disposed within the internal cavity 30 of the machine case 28. The machine stator 26 is connected (e.g., fixedly mounted) to the stationary structure 14. The machine stator 26 of FIG. 1, for example, is fixedly connected to the machine case 28, and the machine case 28 is fixedly connected to the stationary structure 14.

The machine stator 26 of FIG. 1 axially overlaps the machine rotor 24 along the rotational axis 20, and extends circumferentially about (e.g., completely around, circumscribes) the machine rotor 24. The machine rotor 24 of FIG. 1 is thereby disposed within a bore of the machine stator 26. However, the machine rotor 24 may be radially spaced from the machine stator 26 by an annular radial clearance gap 40; e.g., an air gap. The machine rotor 24 may thereby be located in close proximity to, but may not contact, the machine stator 26.

The machine case 28 of FIG. 1 includes a case base 42, a first case wall 43, a second case wall 44, a first case lip 45 and a second case lip 46. Each of these machine case elements 42-46 may extend circumferentially about (e.g., completely around) the rotational axis 20, and are collectively arranged together to form the internal cavity 30 within the machine case 28.

The case base 42 of FIG. 1 is disposed at an outer side 48 of the machine case 28. This case base 42 extends axially along the rotational axis 20 between and to a first side 50 of the machine case 28 and a second side 52 of the machine case 28. The first case wall 43 is disposed at the case first side 50, and is connected to the case base 42. This first case wall 43 projects radially out from (e.g., in a radial inward direction towards the rotational axis 20) the case base 42 to (or towards) an inner side 54 of the machine case 28. The second case wall 44 is disposed at the case second side 52, and is connected to the case base 42. This second case wall 44 projects radially out from (e.g., in the radial inward direction) the case base 42 to (or towards) the case inner side 54. The first case lip 45 is disposed at the case inner side 54, and is connected to the first case wall 43. This first case lip 45 projects axially along the rotational axis 20 (e.g., in a first axial direction towards the machine case elements 44 and/or 46) to a respective distal end. The second case lip 46 is disposed at the case inner side 54, and is connected to the second case wall 44. This second case lip 46 projects axially along the rotational axis 20 (e.g., in a second axial direction towards the machine case elements 43 and/or 45) to a respective distal end.

The internal cavity 30 extends within the machine case 28 axially between and is formed by the first case wall 43 and the second case wall 44. The internal cavity 30 extends within the machine case 28 radially between and is formed by (A) the case base 42 and (B) the first case lip 45 and the second case lip 46. An opening into the internal cavity 30 extends axially between and is formed by the first case lip 45 and the second case lip 46. The machine case 28 may thereby be configured with a channeled (e.g., a C-channeled) sectional geometry when viewed, for example, in the reference plane.

The electric machine 16 of FIG. 1 also includes one or more internal electric machine bearings 56 and 58 (schematically) shown; e.g., rolling element bearings, etc. These machine bearings 56 and 58 are arranged within the internal cavity 30 on opposing sides of the machine rotor 24 as well as on opposing sides of the compliant connection 32; e.g., the spline connection 34.

The first machine bearing 56 is disposed radially between and engaged with a first rotor flange 60 of the machine rotor 24 and the first case lip 45. The first rotor flange 60 may be configured as an outer race for the first machine bearing 56. Alternatively, the first rotor flange 60 may be configured as a mount for the outer race of the first machine bearing 56. The first case lip 45 may be configured as an inner race for the first machine bearing 56. Alternatively, the first case lip 45 may be configured as a mount for the inner race of the first machine bearing 56. The first machine bearing 56 also includes a plurality of first rolling elements 62 arranged circumferentially about the rotational axis 20 in an annular array. These first rolling elements 62 are disposed radially between and engaged with the outer race of the first machine bearing 56 (e.g., the first rotor flange 60) and the inner race of the first machine bearing 56 (e.g., the first case lip 45). With this arrangement, the first machine bearing 56 may be radially outboard of and circumscribe the first case lip 45 of the machine case 28, and the first rotor flange 60 of the machine rotor 24 may be radially outboard of and circumscribe the first machine bearing 56.

The second machine bearing 58 is disposed radially between and engaged with a second rotor flange 64 of the machine rotor 24 and the second case lip 46. The second rotor flange 64 may be configured as an outer race for the second machine bearing 58. Alternatively, the second rotor flange 64 may be configured as a mount for the outer race of the second machine bearing 58. The second case lip 46 may be configured as an inner race for the second machine bearing 58. Alternatively, the second case lip 46 may be configured as a mount for the inner race of the second machine bearing 58. The second machine bearing 58 also includes a plurality of second rolling elements 66 arranged circumferentially about the rotational axis 20 in an annular array. These second rolling elements 66 are disposed radially between and engaged with the outer race of the second machine bearing 58 (e.g., the second rotor flange 64) and the inner race of the second machine bearing 58 (e.g., the second case lip 46). With this arrangement, the second machine bearing 58 may be radially outboard of and circumscribe the second case lip 46 of the machine case 28, and the second rotor flange 64 of the machine rotor 24 may be radially outboard of and circumscribe the second machine bearing 58.

With the foregoing arrangement, the first machine bearing 56 and the second machine bearing 58 rotatably support the machine rotor 24 within the electric machine 16. More particularly, the first machine bearing 56 and the second machine bearing 58 rotatably connect the machine rotor 24 to the machine case 28 and, thereby, to the machine stator 26. The first machine bearing 56 and the second machine bearing 58 are also configured to maintain the clearance gap 40 between the machine rotor 24 and the machine stator 26.

The structure bearing 18 may be arranged discrete from the electric machine 16. The structure bearing 18 of FIG. 1, for example, is arranged outside of and/or spaced from the electric machine 16 and its machine case 28. This structure bearing 18 may be arranged proximate (e.g., close to) the electric machine 16. The structure bearing 18 of FIG. 1, for example, is located axially next to (e.g., axially neighbors) and is disposed on the case second side 52. This structure bearing 18 is spaced from the electric machine 16 and its machine case 28 by an axial gap; e.g., an air gap.

The structure bearing 18 may be configured as a rolling element bearing. The structure bearing 18 of FIG. 1, for example, includes a bearing inner race 68, a bearing outer race 70 and a plurality of bearing rolling elements 72. The inner race 68 is connected (e.g., fixedly mounted) to the rotating structure 12 and its turbine engine shaft 22. The outer race 70 is connected (e.g., fixedly mounted) to the stationary structure 14. The rolling elements 72 are arranged circumferentially about the rotational axis 20 in an array, and disposed radially between and engaged with the inner race 68 and the outer race 70. With this arrangement, the structure bearing 18 is configured to rotatably mount the rotating structure 12 to the stationary structure 14.

Figure 4:
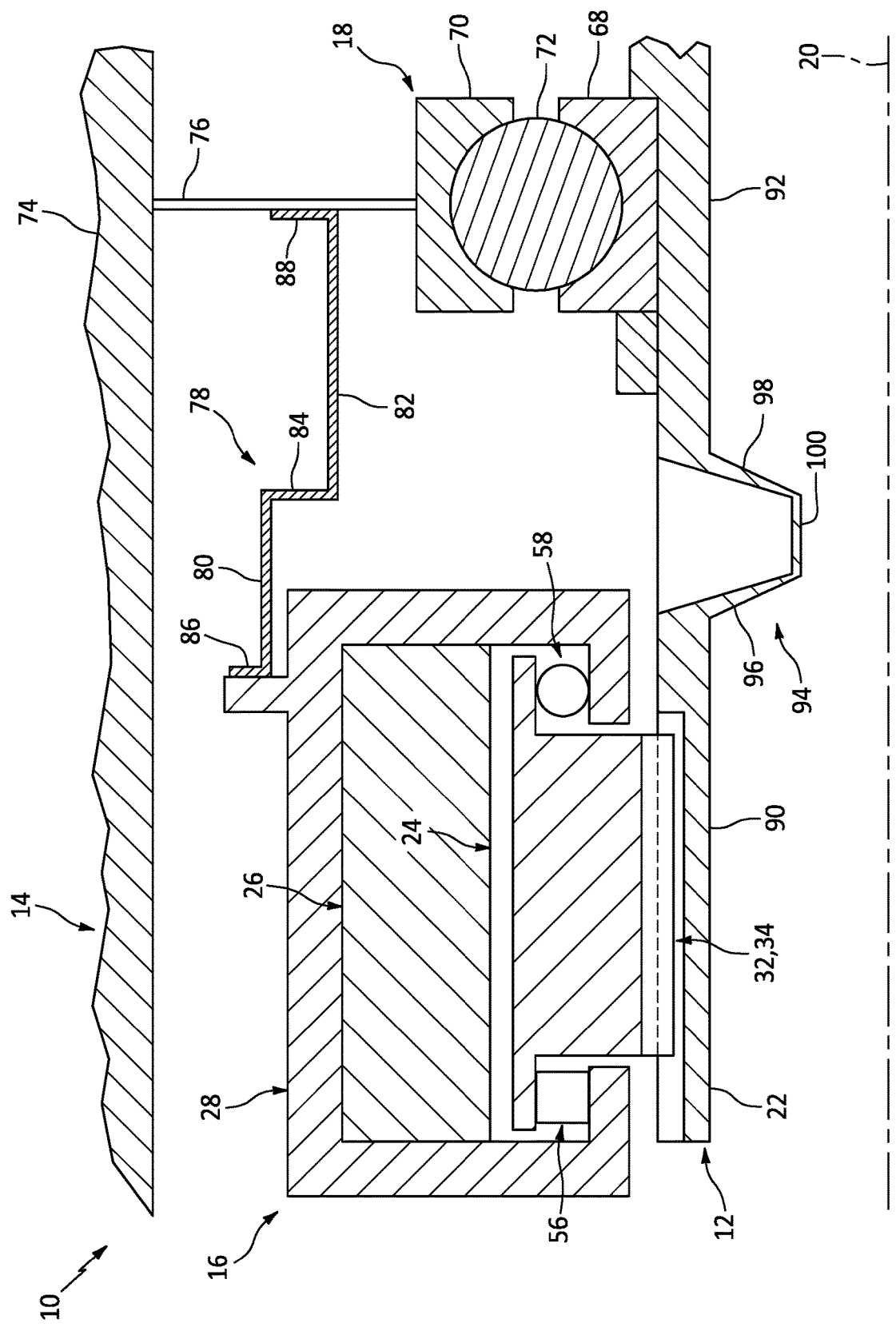
FIG. 4 is a partial side sectional illustration of the turbine engine assembly further configured with one or more flexible couplings.

In some embodiments, referring to FIG. 4, the stationary structure 14 may include a base support 74, a support leg 76 and a flexible coupling 78 (e.g., a flex mount). The base support 74 may be configured as or otherwise include the turbine engine case and/or a support frame (or frames) within and connected to the turbine engine case.

The support leg 76 may be configured as or otherwise include a support strut and/or a mounting structure. The support leg 76 of FIG. 4 is located radially inboard of the base support 74. The support leg 76 is connected to the base support 74. The support leg 76 projects out (e.g., in the radial inward direction) from the base support 74 to or towards a respective component of the turbine engine assembly 10. The support leg 76 of FIG. 1, for example, projects towards and is configured to support the structure bearing 18.

The flexible coupling 78 of FIG. 4 is configured to provide a flexible connection between the base support 74 and the electric machine 16. The flexible coupling 78 of FIG. 4, for example, is arranged between and is connected to the support leg 76 and the machine case 28. This flexible coupling 78 includes a first arm 80, a second arm 82 and a diaphragm 84 axially between and connected to the first arm 80 and the second arm 82. The first arm 80 is connected (e.g., mounted) to the machine case 28 via a first mount 86 of the flexible coupling 78. This first arm 80 extends axially along the rotational axis 20 between and to the first mount 86 and the diaphragm 84. The second arm 82 is connected (e.g., mounted) to the support leg 76 via a second mount 88 of the flexible coupling 78. This second arm 82 extend axially along the rotational axis 20 between and to the second mount 88 and the diaphragm 84. The diaphragm 84 extends radially between and to the first arm 80 and the second arm 82, where a distance (e.g., radius) from the rotational axis 20 to the first arm 80 is different (e.g., greater, or less) than a distance (e.g., a radius) from the rotational axis 20 to the second arm 82. With this arrangement, the diaphragm 84 may facilitate slight axial shifts and/or slight pivoting between the first arm 80 and the second arm 82. The flexible coupling 78 may thereby accommodate operational shifts between the electric machine 16 and the stationary structure 14.

In some embodiments, still referring to FIG. 4, the rotating structure 12 may also or alternatively be configured with a flexible coupling 94; e.g., a flex mount. The rotating structure 12 of FIG. 4, for example, includes a first segment 90 of the turbine engine shaft 22, a second shaft segment 92 of the turbine engine shaft 22, and the flexible coupling 94. The first shaft segment 90 is coupled to the machine rotor 24 via the compliant connection 32; e.g., the spline connection 34. The second shaft segment 92 is rotatably supported by the structure bearing 18.

The flexible coupling 94 of FIG. 4 is configured to provide a flexible connection between the first shaft segment 90 and the second shaft segment 92. The flexible coupling 94 of FIG. 4, for example, is arranged between and connects the first shaft segment 90 and the second shaft segment 92. This flexible coupling 94 includes a first diaphragm 96, a second diaphragm 98 and a bridge 100. The first diaphragm 96 is connected to the first shaft segment 90 and the bridge 100. This first diaphragm 96 extends radially inward (or outward) from the first shaft segment 90 to the bridge 100. The second diaphragm 98 is connected to the second shaft segment 92 and the bridge 100. This second diaphragm 98 extends radially inward (or outward) from the second shaft segment 92 to the bridge 100. The bridge 100 extends axially along the rotational axis 20 between and to the first diaphragm 96 and the second diaphragm 98. With this arrangement, the first diaphragm 96 and/or the second diaphragm 98 may facilitate slight axial shifts and/or slight pivoting between the first shaft segment 90 and the second shaft segment 92. The flexible coupling 94 may thereby accommodate operational shifts between the electric machine 16 and the rotating structure 12.

Figure 5:
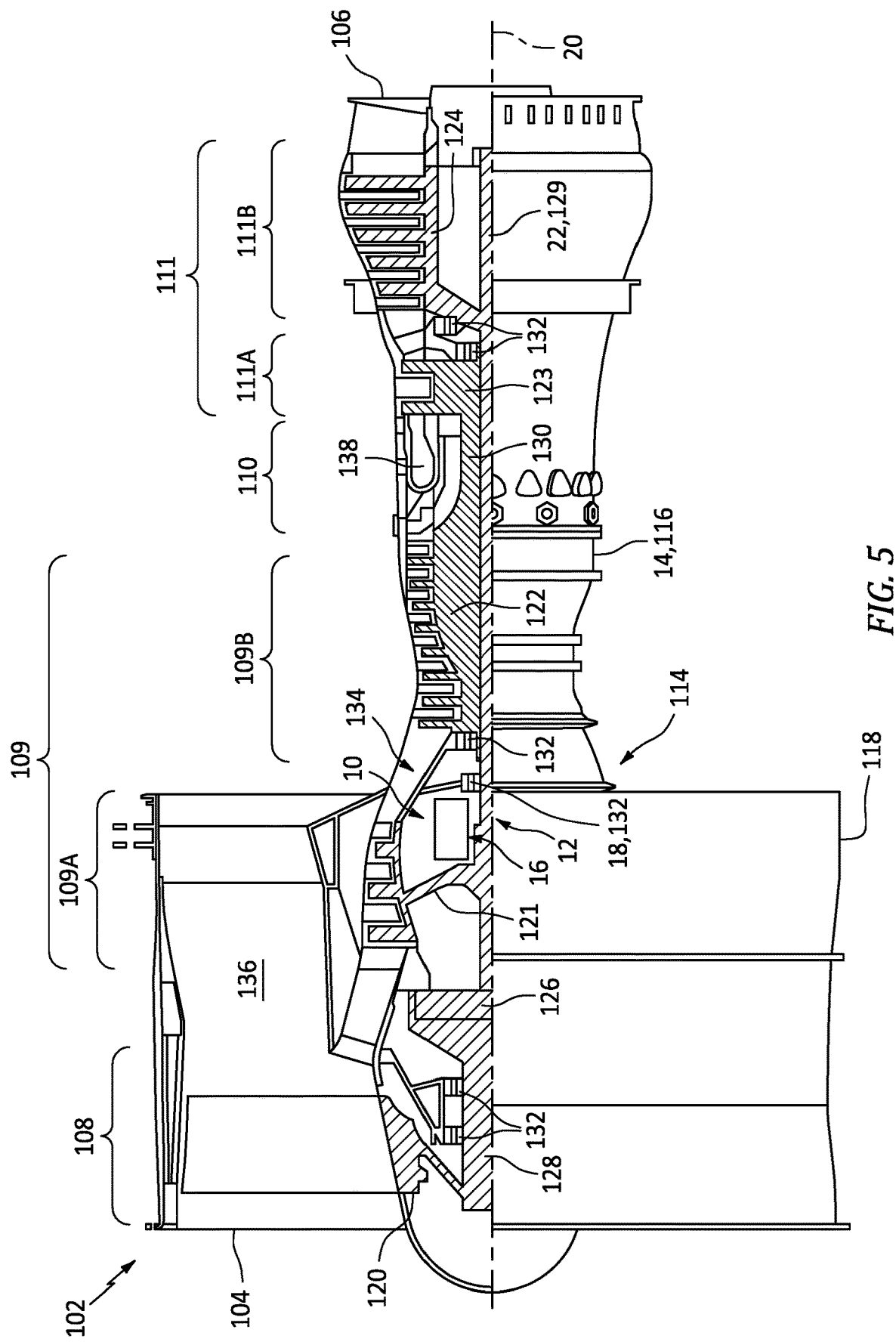
FIG. 5 is a side cutaway illustration of a geared turbofan gas turbine engine.

FIG. 5 illustrates an example of the turbine engine with which the turbine engine assembly 10 may be configured. This turbine engine is configured as a geared, turbofan gas turbine engine 102. This turbine engine 102 extends along the rotational axis 20 between an upstream airflow inlet 104 and a downstream airflow exhaust 106. The turbine engine 102 includes a fan section 108, a compressor section 109, a combustor section 110 and a turbine section 111. The compressor section 109 includes a low pressure compressor (LPC) section 109A and a high pressure compressor (HPC) section 109B. The turbine section 111 includes a high pressure turbine (HPT) section 111A and a low pressure turbine (LPT) section 111B.

The engine sections 108-111B are arranged sequentially along the rotational axis 20 within an engine housing 114. This engine housing 114 includes an inner case 116 (e.g., a core case) and an outer case 118 (e.g., a fan case). The inner case 116 may house one or more of the engine sections 109A-111B (e.g., an engine core) as well as the electric machine 16. The outer case 118 may house at least the fan section 108.

Each of the engine sections 108, 109A, 109B, 111A and 111B includes a respective rotor 120-124. Each of these rotors 120-124 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 120 is connected to a gear train 126, for example, through a fan shaft 128. The gear train 126 and the LPC rotor 121 are connected to and driven by the LPT rotor 124 through a low speed shaft 129. The HPC rotor 122 is connected to and driven by the HPT rotor 123 through a high speed shaft 130. The shafts 128-130 are rotatably supported by a plurality of bearings 132; e.g., rolling element bearings. Each of these bearings 132 is connected to the engine housing 114 by, for example, an annular support strut.

During operation, air enters the turbine engine 102 through the airflow inlet 104. This air is directed through the fan section 108 and into a core flowpath 134 and a bypass flowpath 136. The core flowpath 134 extends sequentially through the engine sections 109A-111B. The air within the core flowpath 134 may be referred to as "core air". The bypass flowpath 136 extends through a bypass duct, which bypasses the engine core. The air within the bypass flowpath 136 may be referred to as "bypass air".

The core air is compressed by the LPC rotor 121 and the HPC rotor 122 and directed into a combustion chamber 138 of a combustor in the combustor section 110. Fuel is injected into the combustion chamber 138 and mixed with the compressed core air to provide a fuel-air mixture. This fuel air mixture is ignited and combustion products thereof flow through and sequentially cause the HPT rotor 123 and the LPT rotor 124 to rotate. The rotation of the HPT rotor 123 and the LPT rotor 124 respectively drive rotation of the HPC rotor 122 and the LPC rotor 121 and, thus, compression of the air received from a core airflow inlet. The rotation of the LPT rotor 124 also drives rotation of the fan rotor 120, which propels bypass air through and out of the bypass flowpath 136. The propulsion of the bypass air may account for a majority of thrust generated by the turbine engine 102, e.g., more than seventy-five percent (75%) of engine thrust. The turbine engine of the present disclosure, however, is not limited to the foregoing exemplary thrust ratio.

The turbine engine assembly 10 may be configured at various different locations within the turbine engine 102. For example, the turbine engine assembly 10 and its electric machine 16 may be housed within the engine housing 114 and, more particularly, the inner case 116. The stationary structure 14, for example, may be or otherwise include the inner case 116. The electric machine 16 may also be disposed radially inboard of the core flowpath 134, where the core flowpath 134 axially overlaps and extends circumferentially about (e.g., completely around, circumscribes) the electric machine 16. For example, the electric machine 16 may be arranged with/axially aligned with the compressor section 109, where the turbine engine shaft 22 may be one of the shafts 128-130 (e.g., 129) and the bearing 18 may be a respective one of the bearings 132 supporting the respective shaft. The present disclosure, however, is not limited to such an exemplary arrangement. For example, in other embodiments, the turbine engine assembly 10 and its electric machine 16 may also or alternatively be arranged with/aligned with another one or more sections 108, 110 and/or 111 of the turbine engine 102.

The turbine engine assembly 10 may be included in various turbine engines other than the one described above. The turbine engine assembly 10, for example, may be included in a geared turbine engine where a gear train connects one or more shafts to one or more rotors in a fan section, a compressor section and/or any other engine section. Alternatively, the turbine engine assembly 10 may be included in a direct drive turbine engine configured without a gear train. The turbine engine assembly 10 may be included in a turbine engine configured with a single spool, with two spools (e.g., see FIG. 5), or with more than two spools. The turbine engine may be configured as a turbofan engine, a turbojet engine, a turboprop engine, a turboshaft engine, a propfan engine, a pusher fan engine or any other type of turbine engine. The turbine engine may alternative be configured as an auxiliary power unit (APU) or an industrial gas turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a turbine engine, comprising:
   a rotating structure configured to rotate about a rotational axis, the rotating structure comprising a shaft and a plurality of rotating structure splines;
   a stationary structure circumscribing the rotating structure;
   an electric machine including a rotor circumscribing the rotating structure and comprising a plurality of machine rotor splines;
   a stator connected to the stationary structure;
   a case including a first case lip and a second case lip, the stator disposed entirely within an internal cavity of the case;
   a first bearing radially outboard of and circumscribing the first case lip;
   and a second bearing radially outboard of and circumscribing the second case lip; and
   a spline connection between the rotating structure and the rotor;
   wherein the plurality of machine rotor splines are meshed with the plurality of rotating structure splines and each of the plurality of machine rotor splines contacts a respective one of the plurality of rotating structure splines;
   wherein the rotor is rotatably supported by the first bearing and the second bearing; and
   wherein the spline connection is disposed axially between the first bearing and the second bearing along the rotational axis;
   wherein the rotor includes a first flange of the rotor supported by the first bearing, and a second flange of the rotor supported by the second bearing; and
   wherein the first bearing is supported by the first case lip of the case, and the second bearing is supported by the second case lip of the case.

2. The assembly of claim 1, wherein the spline connection comprises a crowned spline connection.

3. The assembly of claim 1, wherein the spline connection is axially aligned with the rotor along the rotational axis.

4. The assembly of claim 1, wherein
the case houses the rotor and the stator;
the rotor is rotatably mounted to the case by the first bearing and the second bearing; and
the stator is mounted to the case adjacent the rotor.

5. The assembly of claim 4, wherein at least one of the first flange of the rotor circumscribes the first bearing, and the first bearing circumscribes the first case lip of the case; or the second flange of the rotor circumscribes the second bearing, and the second bearing circumscribes the second case lip of the case.

6. The assembly of claim 1, wherein at least one of the first bearing comprises a first rolling element, the first flange of the rotor projects axially out from a base of the rotor, and the first flange of the rotor is arranged radially between the stator and the first rolling element; or the second bearing comprises a second rolling element, the second flange of the rotor projects axially out from the base of the rotor, and the second flange of the rotor is arranged radially between the stator and the second rolling element.

7. The assembly of claim 1, wherein
the stationary structure includes a base support and a flexible coupling; and
the stator is connected to the base support through the flexible coupling.

8. The assembly of claim 1, wherein
the rotating structure includes a first shaft segment, a second shaft segment and a flexible coupling connecting the first shaft segment to the second shaft segment; and
the spline connection couples the rotor to the first shaft segment.

9. The assembly of claim 1, wherein the electric machine is configured as a motor during at least one mode of operation.

10. The assembly of claim 1, wherein the electric machine is configured as a generator during at least one mode of operation.

11. The assembly of claim 1, further comprising:
a compressor section, a combustor section and a turbine section arranged along the rotational axis; and
a case housing the compressor section, the combustor section, the turbine section and the electric machine.

12. The assembly of claim 1, further comprising:
a compressor section, a combustor section, a turbine section and a flowpath extending sequentially through the compressor section, the combustor section and the turbine section;
the electric machine radially inboard of the flowpath.

13. The assembly of claim 1, wherein the rotating structure comprises a compressor rotor, a turbine rotor and a shaft coupling the turbine rotor to the compressor rotor.

14. The assembly of claim 13, wherein the compressor rotor and the turbine rotor are axially disposed to a common side of the electric machine.

15. An assembly for a turbine engine, comprising:
a rotating structure configured to rotate about a rotational axis;
a stationary structure circumscribing the rotating structure, the stationary structure including a base support and a flexible coupling; and
an electric machine including:
a rotor including a first rotor flange and a second rotor flange; and
a stator connected to the base support through the flexible coupling;
wherein the rotor is coupled to the rotating structure through a compliant connection where the rotor contacts the rotating structure;
a case including a first case lip and a second case lip, the stator disposed entirely within an internal cavity of the case;
a first bearing radially outboard of and circumscribing the first case lip; and
a second bearing radially outboard of and circumscribing the second case lip;
wherein the first rotor flange is supported by the first bearing, and the second rotor flange is supported by the second bearing; and
wherein the first bearing is supported by the first case lip of the case, and the second bearing is supported by the second case lip of the case.

16. The assembly of claim 15, wherein
the rotating structure includes a first shaft segment, a second shaft segment and a second flexible coupling connecting the first shaft segment to the second shaft segment; and
the compliant connection couples the rotor to the first shaft segment.

17. The assembly of claim 15, wherein the compliant connection comprises a spline connection between the rotor and the rotating structure.

18. The assembly of claim 15, wherein the rotor is rotatably supported by the first bearing and the second bearing; and the compliant connection is arranged axially between the first bearing and the second bearing along the rotational axis.

19. An assembly for a turbine engine, comprising:
a rotating structure configured to rotate about a rotational axis, the rotating structure including a first shaft segment, a second shaft segment and a flexible coupling connecting the first shaft segment to the second shaft segment, and the flexible coupling comprising a diaphragm;
a stationary structure circumscribing the rotating structure; and
an electric machine including a rotor and a stator, the rotor coupled to the first shaft segment through a compliant connection where the rotor contacts the first shaft segment, the compliant connection radially between the rotor and the first shaft segment, and the stator connected to the stationary structure;
a case including a first case lip and a second case lip, the stator disposed entirely within an internal cavity of the case;
a first bearing radially outboard of and circumscribing the first case lip; and
a second bearing radially outboard of and circumscribing the second case lip;
wherein a first rotor flange is supported by the first bearing, and a second rotor flange is supported by the second bearing; and
wherein the first bearing is supported by the first case lip of the case, and the second bearing is supported by the second case lip of the case.

* * * * *